Aug. 19, 1958     W. C. HACKMAN     2,848,588
CONTROL SYSTEM FOR ELECTRIC HEATING
Filed June 29, 1956     2 Sheets-Sheet 1
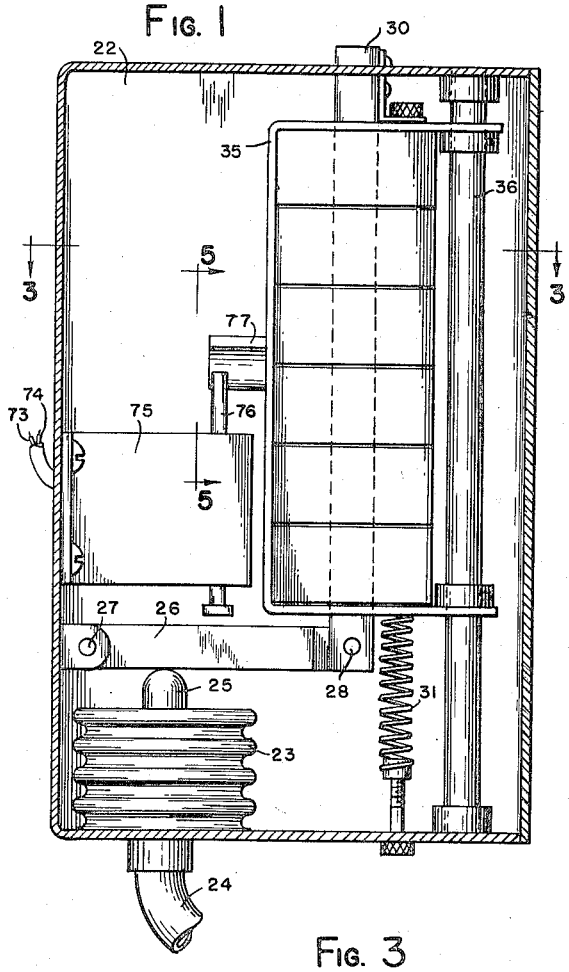
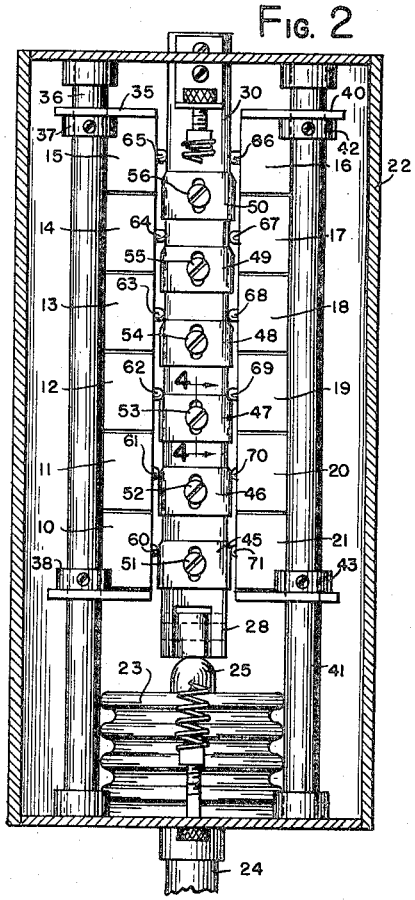
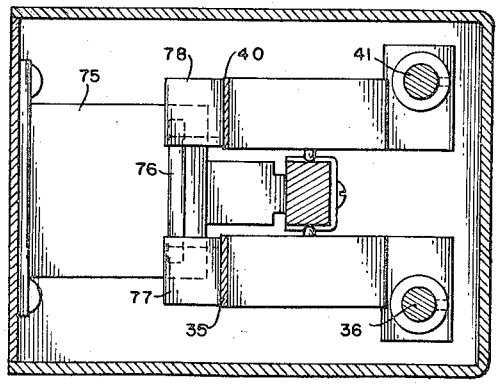
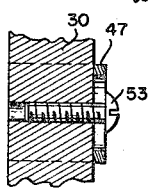
INVENTOR
WILLIAM C. HACKMAN
BY Doa T. Hatfield
ATTORNEY Aug. 19, 1958 W. C. HACKMAN 2,848,588
CONTROL SYSTEM FOR ELECTRIC HEATING
Filed June 29, 1956 2 Sheets-Sheet 2
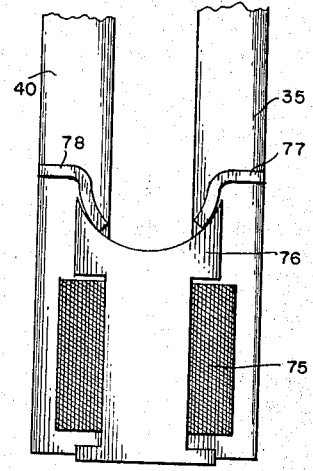
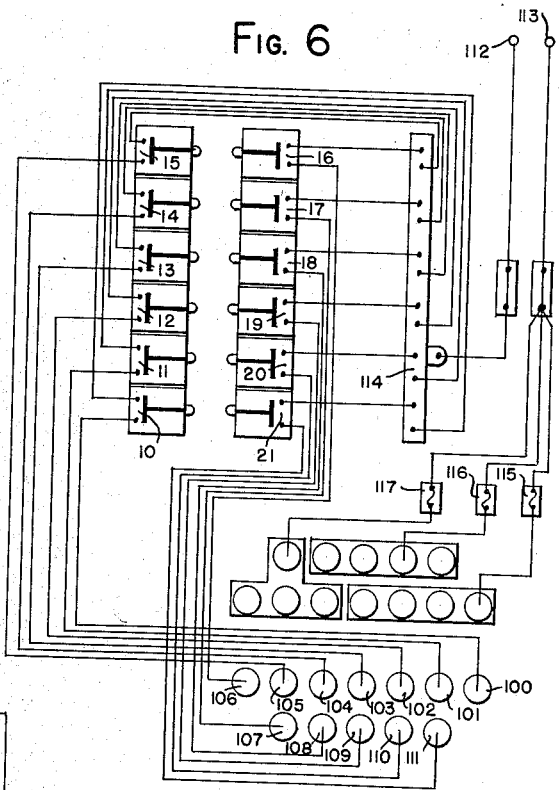
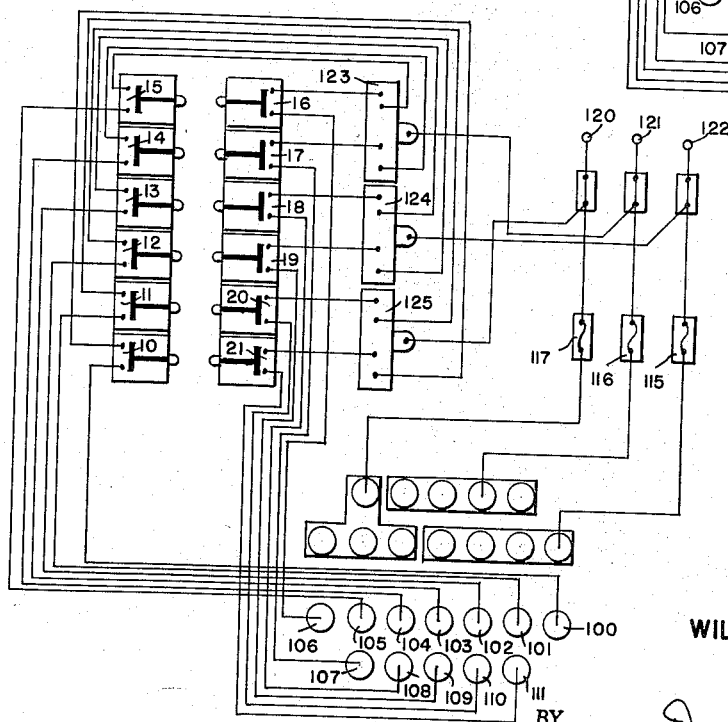
INVENTOR
WILLIAM C. HACKMAN
BY
ATTORNEY

2,848,588

CONTROL SYSTEM FOR ELECTRIC HEATING

William C. Hackman, Silver Spring, Md., assignor to American Energetics Corporation, a corporation of the District of Columbia Application June 29, 1956, Serial No. 594,815

8 Claims. (Cl. 219—20)

The present invention relates to electric controls and more particularly to automatically controlled switching arrangements for electric heating systems or the like.

Automatic control systems for electric heating systems such as electric hot water heaters or the like are well known. The conventional electric hot water heater has been provided with a plurality of electric heating units and various control circuits and devices have been arranged to control the connection of energizing electric current to the heating units in accordance with demand. It has been found that the connection of electricity to all the heating units instantaneously at the moment of demand is not entirely satisfactory because the large amount of current thereby required may be harmful to the switching contacts and the power source. Furthermore, the simultaneous energization of all of the individual heating elements at the first moment of demand when the water to be heated is relatively cold will release large quantities of energy and cause unpleasant pounding due to the gases which are thereby instantly released. Also, high capacity and relatively expensive relays and switch contacts must be provided if simultaneous automatic control of a plurality of heating units is to be provided.

It is therefore a principal object of the present invention to provide an improved automatic electric control for electric heating systems of the type having a plurality of individual heating elements.

Another object of the invention is to provide an improved automatically controlled electric switching mechanism especially arranged for controlling the connection of electricity to individual ones of a plurality of electric heating elements as used in a water heater in accordance with both demand and the temperature of the water.

According to the invention, the heating system such as an electric water heater having a plurality of individual electrically energized heating units is provided with an automatically controlled electric switching system for connecting electricity to the individual heating units in a predetermined order in accordance with either the demand for heat or pressure and the momentary temperature of the water within the heater. The arrangement may be such that the heater is controlled to operate over a range of temperatures from a minimum to a maximum such as from 160° to 180° Fahrenheit. When the condition of the heating system, such as indicated for example by the temperature or pressure of the water, falls below the minimum, a demand for heat is established by a suitable demand device which closes a circuit to energize preferably only one or two heating units. As the condition or temperature of the heating system rises and continues to rise, the electric controls of the invention are effective to progressively energize additional heating units until all of the heating units may be energized or until the maximum temperature or condition is reached. When the maximum desired temperature or condition of water in the heater or of the heating system is reached, the control system of the invention functions to instantly disconnect the electricity to all of the individual heating units that at that time may be energized and until the temperature or condition of the heating system thereafter falls to the minimum value, none of the heating units will be energized. It should therefore be apparent that the instantaneous application of large amounts of electrical and heat energy at a time when the condition or temperature of water in the heater is relatively low or at the minimum is prevented by the control system of this invention.

Another object of the invention is to provide an improved automatically controlled switching system for an electric heating system that is arranged to use relatively inexpensive switching contacts with relatively small current flow through the contacts and consequent long contact life.

Further objects, features and the attending advantages of the invention will be apparent with reference to the following specification and drawings in which:

Fig. 1 is a side elevational view partly in section of the automatically controlled heater unit controlling switches of the invention;

Fig. 2 is a front view partly in section as seen from right to left of Fig. 1;

Fig. 3 is a cross-sectional view in the direction of the arrows on the line 3—3 of Fig. 1;

Fig. 4 is a fragmentary sectional view on the line 4—4 of Fig. 2;

Fig. 5 is a detailed sectional view on the line 5—5 of Fig. 1;

Fig. 6 is a circuit diagram for wiring the switches to a plurality of electric heating units and a single phase alternating current or a direct current supply;

Fig. 7 is a circuit diagram to show a modified form of wiring for the switches when used with a three-phase alternating current supply; and Fig. 8 is a switching circuit diagram for the demand device to control the heating unit switches.

For a more complete description of the mechanical arrangement of the electric switching system of the invention, reference is now made to Figures 1 through 5 of the drawings. For purposes of simplification, the heating system such as a water heater is not shown, although it should be understood that the invention may be used for any such application where a plurality of electric heating units are to be controlled.

The electric control switches 10 through 21 which may be of an expensive low current capacity type are mounted within a suitable housing or enclosure generally shown at 22 and for which no details are described since such housing may be of any suitable form or arrangement obvious to those skilled in the art. A thermostatic bellows or bulb 23 is also mounted within the housing 22 and is connected by the tubing 24 to a suitable temperature or pressure sensing bulb (not shown) in the heating system to be controlled. This arrangement is conventional and provides that the bellows plunger 25 will move upwardly as seen on the drawing when the temperature or pressure of the heating system rises.

One end of a lever arm 26 is pivoted at 27 to the housing 22 and the other end is pivotally connected at 28 to a vertically movable switch actuating arm 30. The actuating arm 30 is normally urged downward by the tension of the coil spring 31 so that the lever arm 26 is brought into engagement with the bellows plunger 25. Therefore, the switch actuating arm will assume a vertical position varying in accordance with the position of the thermostatic bellows plunger 25 and thus proportional to the temperature or pressure of the heating system such as indicated by the condition of the water within a water heater. Obviously, the switch actuating arm is guided in its vertical movement by suitable bearing slideways carried by the housing 22 and not shown in detail in order to simplify the drawings.

The switches 10 through 15 are secured to a U-shaped switch-supporting frame 35 that is rotatably mounted on a vertical post 36 supported to one side of the switching arm 30 within the housing 22. Threaded collars 37 and 38 may adjustably predetermine the vertical position of the switch-supporting frame 35. Similarly, switches 16 through 21 are secured to the U-shaped switch-supporting frame 40 that is rotatably journalled on the vertical post 41 by means of the threaded collars 42, 43.

It will be noted that switch actuating cam plates 45 through 50 are secured by means of bolts 51 through 56, respectively, to the switch actuating arm 30. Each of the switches 10 through 21 is provided with one of the spring loaded plungers 60 through 71 to be depressed against spring force for closing the respective switch contacts. Normally the spring loading of the switch plungers 60 through 71 is sufficient to pivotally move the switch-supporting frames 35 and 40 away from the switch actuating arm 30 instead of closing any of the respective switch contacts. However, an electromagnet 75 is mounted as shown within the housing 22 and is provided with a pole piece 76 arcuately shaped as shown in detail in Fig. 5 for cooperation with magnet armature pieces 77 and 78 that are carried by the switch frames 35 and 40 respectively.

Considering also Fig. 8 of the drawings, whenever there is a demand for heat, the magnet or relay 75 is energized by a circuit including conductors 73, 74 controlled by demand device contacts 80 (assuming the low water contacts 81 and the manual switch contacts 82 are both closed), and the armatures 77 and 78 are attracted to thereby pivot the switch frames 35 and 40 towards the switch actuating arm 30 and cause respective ones of the switch plungers 60 through 71 to be depressed depending upon the vertical position of the switch arm 30. It will be noted that each switch actuating cam plate 45 through 50 is vertically adjustable in its position on the actuating arm 30 by means of the associated fastening bolt and slot shown in detail in Fig. 4 of the drawings. According to the invention, the preferred adjustment is such that only switches 10 and 21 will be closed at a time when the temperature within the heating system is at or below the minimum and while the electromagnet 75 is energized by closure of the demand thermostatic contacts (not shown). Thereafter, as the temperature of the heating system is raised by heat supplied from heating units controlled by switches 10 and 21, the bellows 23 will expand to raise the switch arm 30 and progressively close switches 11, 20, then switches 12, 19, and so forth until either all switches 10 through 21 are closed with all heating units energized or the temperature of the heating system rises to the maximum point at which time the demand device opens its contacts 80 to de-energize the electromagnet 75. When the electromagnet 75 de-energizes, the switch supporting frames 35 and 40 pivot away from the actuating arm 30 so that all switches 10 through 21 are simultaneously opened and their associated heating units de-energized. The arrangement may be such that when the heater is first connected and the water is cold, only switches 10 and 21 will be closed but if the minimum and maximum range of control is of close tolerance, then after the temperature of the water falls to the minimum range from the maximum range, all or most of the individual switches 10 through 21 will be energized. At this time, water pounding would be avoided since the temperature of the water is already relatively high.

Alternatively, if desired, the switch operating cams 45, 46 or 47 may be adjusted to cause the simultaneous operation and closure of switches 10—12 and 19—21 at the moment of demand when the electromagnet 75 is first energized. However, it is preferred to position the cams 45 through 50 such that only switches 10 and 21 will be closed at the moment of demand assuming that the temperature of the water within the heater is quite cold and well below the minimum value as predetermined by the setting of the automatic demand device controlled bellows 23.

The tension of spring 31 may be adjusted by the screws at the top and bottom to in turn adjust the maximum temperature to be reached. For instance, the spring would probably be adjusted so that there would be a water temperature range of from 160° minimum to 180° maximum. However, if a 200° maximum was desired, the tension on the spring 31 could be increased to offset the pressure bellows 23 and the thermostat or pressure switch would likewise be adjusted for this increased maximum temperature.

Fig. 6 of the drawings shows the wiring connections between the switch contacts 10–21 and a plurality of individual heating elements 100 through 111. Either a single phase alternating current or a direct current source is shown to be connected at terminals 112, 113. Terminal 112 connects to a distribution bus bar 114 which is in turn connected to a contact of each of switches 10 through 21. The other contact of each of switches 10 through 21 is respectively connected to one end of one of the heating elements 100 through 111. The other ends of heating elements 100 through 104 are connected through fuse 115 to terminal 113. Similarly, the other ends of heating elements 104 through 107 also are connected through fuse 116, and elements 108 through 111 also are connected through fuse 117 to terminal 113. Since the current supplied to each heating element is controlled by a single one of the switches 10 through 21, such switches may be simple and inexpensive with relatively low current contacts.

Fig. 7 of the drawings shows a modified circuit arrangement for connection to a three-phase alternating current supply at terminals 120, 121 and 122. In this arrangement the distribution bus bar is separated into three insulated sections 123, 124 and 125, and the return circuits from fuses 115, 116 and 117 are connected to a respective three-phase terminal 122, 121 and 120 instead of to a single terminal such as was shown at 113 in Fig. 6 of the drawings.

It should be understood that various modifications may be made within the spirit of the invention and the scope of the appended claims. For example, the invention is not limited to a specific number of individual control switches and heating units controlled thereby. Although there has been specifically described a form of the invention in which two heating units are initially energized upon demand when the heating system condition is at a minimum, obviously one or more heating units may be arranged to be energized at that time so long as the number energized at that time is less than the number to be ultimately energized as the condition rises towards the maximum.

Throughout the specification, reference has been made to a demand device for controlling the pressure in the bellows 23. It should be understood that such demand device may be controlled by either the temperature or pressure of the water in the heating system, as desired. In the claims it will be understood that the condition of the heating system may be indicated and sensed by either the temperature or pressure of the heating system water for controlling the demand device.

What is claimed is:

1. In a control for an electric heating system of the type having a plurality of electrically energized heating units, a plurality of control switches adapted to be operated for connecting electric energy to respective ones of the heating units, switch control means movable in a direction relative to said control switches in response to a rise in temperature of the heating system and normally out of engagement with said control switches, and demand means operative to respond to a temperautre of the heating system at or below a predetermined minimum value for moving said plurality of switches into the path of movement of said control means to engage and operate respective ones of said control switches depending upon the position of said control means as determined by the temperature of the heating system.

2. The invention of claim 1 wherein said control means is adapted to engage and operate progressively more of said control switches as it is moved in response to a rise in temperature of the heating system while said demand means is operative.

3. In a control for an electric heating system of the type having a plurality of electrically energized heating units, a plurality of control switches adapted to be operated for connecting electric energy to respective ones of the heating units, switch control means movable in a direction relative to said control switches in response to a rise in temperature of the heating system and normally out of engagement with said control switches, demand means operative to respond to a temperature of the heating system at or below a predetermined minimum value for moving said plurality of switches into the path of movement of said control means to engage and operate respective ones of said control switches depending upon the position of said control means as determined by the temperature of the heating system, said demand means being also operative to respond to a maximum temperature of the heating system for moving said switches out of the path of movement of said control means to thereby restore all of said switches to their unoperated conditions upon maximum temperature being reached.

4. The invention of claim 3 wherein said control means is adapted to engage and operate progressively more of said control switches as it is moved in response to a rise in temperature of the heating system while said demand means is operative.

5. The invention of claim 1 wherein said control means is adapted to engage and operate a minimum number of said switches less than the total number of said switches when said demand means is operative and the temperature of said heating system is at or below a predetermined minimum value.

6. The invention of claim 1 wherein said control means is adapted to engage and operate a minimum number of said switches less than the total number of said switches when said demand means is operative and the temperature of said heating system is at or below a predetermined minimum value and is adapted to engage and progressively operate additional ones of said control switches as it is moved in response to a rise in temperature of the heating system above the predetermined minimum value.

7. The invention of claim 3 wherein said control means is adapted to engage and operate a minimum number of said switches less than the total number of said switches when said demand means is operative and the temperature of said heating system is at or below a predetermined minimum value.

8. The invention of claim 3 wherein said control means is adapted to engage and operate a minimum number of said switches less than the total number of said switches when said demand means is operative and the temperature of said heating system is at or below a predetermined minimum value and is adapted to engage and progressively operate additional ones of said control switches as it is moved in response to a rise in temperature of the heating system above the predetermined minimum value.

References Cited in the file of this patent
UNITED STATES PATENTS

| Number | Name | Date |
|---|---|---|
| 1,194,165 | Fry | Aug. 8, 1916 |
| 1,883,766 | Cox et al. | Oct. 18, 1932 |
| 2,161,614 | Cunningham | June 6, 1939 |
| 2,419,083 | Myers | Apr. 15, 1947 |
| 2,598,036 | Cahill et al. | May 27, 1952 |
| 2,706,240 | Hackman | Apr. 12, 1955 |
| 2,788,416 | Kilbury | Apr. 9, 1957 |

UNITED STATES PATENT OFFICE
CERTIFICATE OF CORRECTION

Patent No. 2,848,588                                          August 19, 1958

William C. Hackman

It is hereby certified that error appears in the above numbered patent requiring correction and that the said Letters Patent should read as corrected below.

In the grant, lines 2 and 3, for "assignor to Energetics Corporation, a corporation of the District of Columbia," read -- assignor of one-half to American Energetics Corporation, a corporation of the District of Columbia, --; line 12, for "Energetics Corporation, its successors" read -- William C. Hackman, his heirs or assigns, and American Energetics Corporation, its successors --; in the heading to the printed specification, lines 3, 4 and 5, for "assignor to American Energetics Corporation, a corporation of the District of Columbia" read -- assignor of one-half to American Energetics Corporation, a corporation of the District of Columbia --.

This certificate supersedes Certificate of Correction issued October 21st, 1958.

Signed and sealed this 31st day of March 1959.

(SEAL)
Attest:

KARL H. AXLINE
Attesting Officer

ROBERT C. WATSON
Commissioner of Patents